United States Patent
Lyons et al.

(10) Patent No.: US 10,423,949 B2
(45) Date of Patent: Sep. 24, 2019

(54) VENDING MACHINE TRANSACTIONS

(71) Applicant: MasterCard International Incorporated, Purchase, NY (US)

(72) Inventors: Garry Lyons, Dublin (IE); Eamon Doyle, Dublin (IE); Saravana Perumal Shanmugam, Fremont, CA (US); Donghao Huang, Singapore (SG); Jiaming Li, Singapore (SG); Oran Cummins, Dublin (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 680 days.

(21) Appl. No.: 15/094,370

(22) Filed: Apr. 8, 2016

(65) Prior Publication Data

US 2016/0335620 A1    Nov. 17, 2016

(30) Foreign Application Priority Data

Apr. 10, 2015 (GB) .................................. 1506135.1

(51) Int. Cl.
*G06Q 20/32* (2012.01)
*H04W 4/80* (2018.01)
(Continued)

(52) U.S. Cl.
CPC .......... *G06Q 20/327* (2013.01); *G06Q 20/18* (2013.01); *G06Q 20/322* (2013.01); *G06Q 20/36* (2013.01);
(Continued)

(58) Field of Classification Search
CPC ........ G06Q 10/00; G06Q 20/00; G06Q 30/00; G06Q 40/00
(Continued)

(56) References Cited

U.S. PATENT DOCUMENTS 7,587,196 B2 *   9/2009   Hansen ................. G06Q 20/00
                                                                  455/406
8,856,045 B1 *  10/2014   Patel ................... G06Q 20/3823
                                                                   705/71
(Continued)

FOREIGN PATENT DOCUMENTS

WO      2015/095599 A1    6/2015

OTHER PUBLICATIONS

First Examination Report dated May 28, 2018, by the New Zealand Intellectual Property Office in corresponding New Zealand Patent Application No. 736244. (8 pages).

*Primary Examiner* — Frantzy Poinvil
(74) *Attorney, Agent, or Firm* — Buchanan Ingersoll & Rooney PC

(57) ABSTRACT

A method of transaction between a mobile payment device and a vending machine is described, together with a system and elements of a system supporting such a method of transaction. The method comprises establishing wireless contact between the mobile payment device and the vending machine. Vending machine transaction details are established between the mobile payment device and the vending machine. These vending machine transaction details are sent to a vending platform associated with a payment infrastructure where the vending machine transaction is authorized. The vending platform then provides an authorization token for the vending machine transaction, allowing the vending machine to enable vending when the authorization token has been received.

18 Claims, 10 Drawing Sheets

(51) Int. Cl.
*G06Q 20/36* (2012.01)
*G07F 7/00* (2006.01)
*G06Q 20/18* (2012.01)
*G06Q 20/40* (2012.01)

(52) U.S. Cl.
CPC .............. *G06Q 20/40* (2013.01); *G07F 7/00* (2013.01); *H04W 4/80* (2018.02)

(58) Field of Classification Search
USPC ........................................................ 705/3–44
See application file for complete search history.

(56) References Cited

U.S. PATENT DOCUMENTS

| | | | | |
|---|---|---|---|---|
| 9,026,461 | B2 * | 5/2015 | Calman | G07F 19/201 |
| | | | | 705/18 |
| 9,134,994 | B2 | 9/2015 | Patel et al. | |
| 9,256,873 | B2 | 2/2016 | Patel et al. | |
| 9,262,771 | B1 | 2/2016 | Patel | |
| D755,183 | S | 5/2016 | Patel et al. | |
| 2011/0208529 | A1 * | 8/2011 | Jeal | G06F 21/12 |
| | | | | 705/1.1 |
| 2013/0191232 | A1 * | 7/2013 | Calman | G07F 19/201 |
| | | | | 705/18 |
| 2014/0156448 | A1 * | 6/2014 | Grigg | G06Q 30/0261 |
| | | | | 705/26.7 |
| 2014/0214688 | A1 * | 7/2014 | Weiner | G06Q 20/3227 |
| | | | | 705/71 |
| 2015/0100152 | A1 | 4/2015 | Barragan Trevino et al. | |
| 2015/0169312 | A1 | 6/2015 | Patel et al. | |
| 2015/0170129 | A1 | 6/2015 | Patel et al. | |
| 2015/0170130 | A1 | 6/2015 | Patel et al. | |
| 2015/0170131 | A1 | 6/2015 | Patel | |
| 2015/0170132 | A1 | 6/2015 | Patel | |
| 2015/0170136 | A1 | 6/2015 | Patel et al. | |
| 2015/0170145 | A1 | 6/2015 | Patel et al. | |
| 2015/0170361 | A1 * | 6/2015 | Wang | A61B 6/5205 |
| | | | | 378/9 |
| 2015/0178702 | A1 | 6/2015 | Patel | |
| 2015/0227928 | A1 * | 8/2015 | Patel | G06Q 20/3823 |
| | | | | 705/71 |
| 2015/0254698 | A1 * | 9/2015 | Bondesen | G06Q 30/0215 |
| | | | | 705/14.17 |
| 2015/0287030 | A1 * | 10/2015 | Sagady | G06Q 20/3829 |
| | | | | 705/71 |
| 2015/0294306 | A1 * | 10/2015 | Grigg | G06Q 20/3821 |
| | | | | 705/67 |
| 2016/0078421 | A1 * | 3/2016 | Barragan Trevino | G06Q 20/322 |
| | | | | 705/17 |
| 2016/0098711 | A1 | 4/2016 | Patel et al. | |
| 2016/0225010 | A1 | 8/2016 | Patel | |

\* cited by examiner

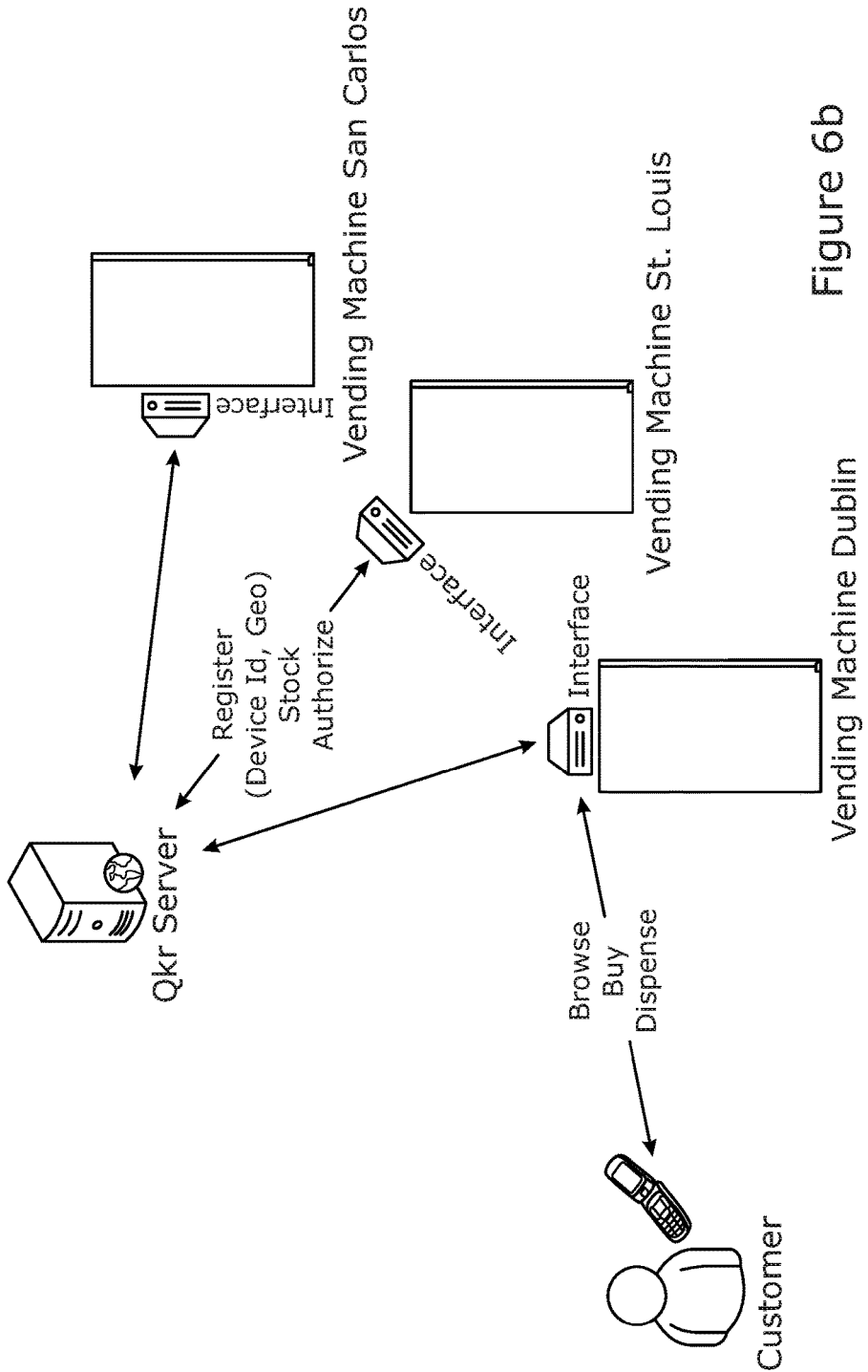

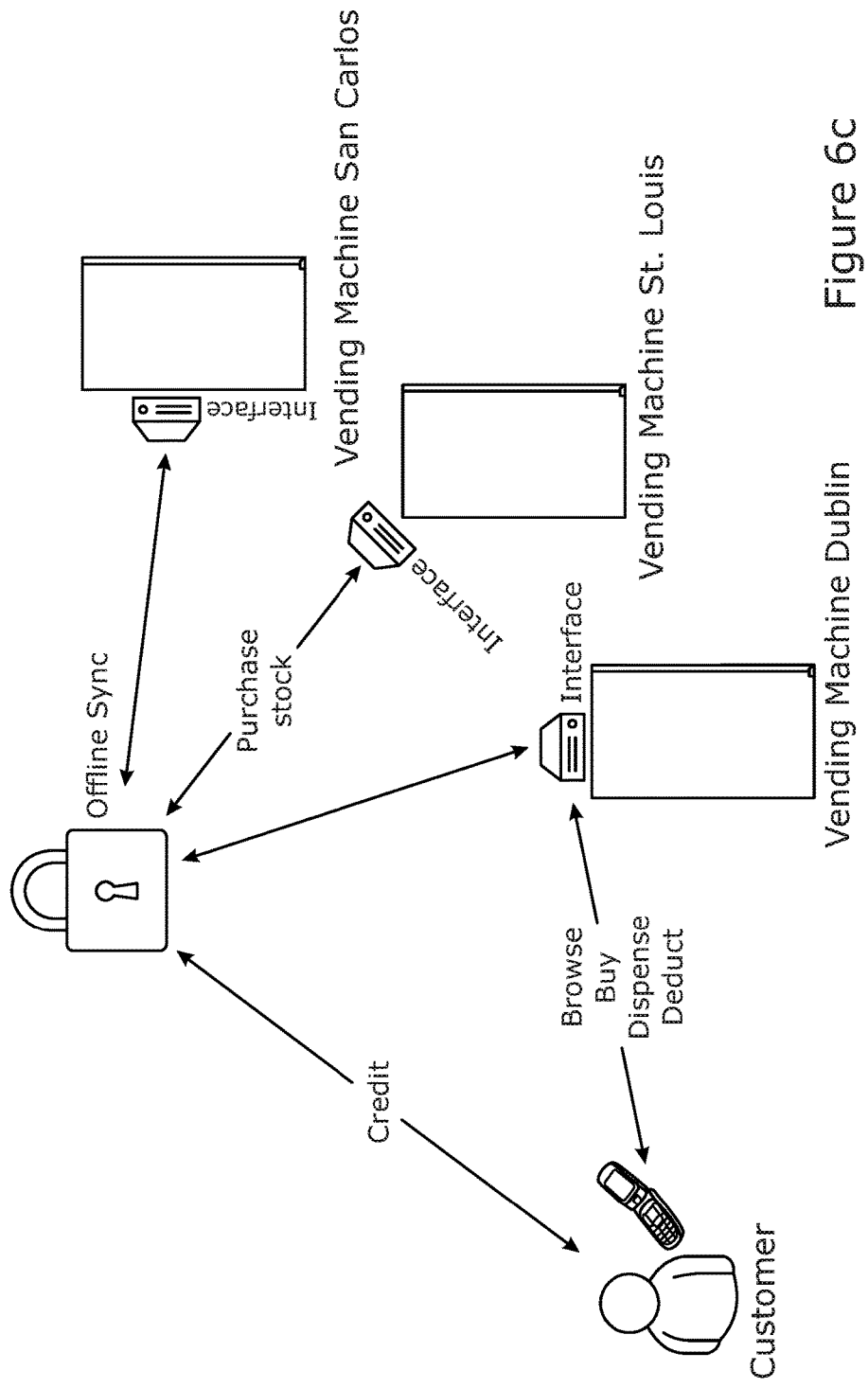

VENDING MACHINE TRANSACTIONS

FIELD OF DISCLOSURE

This disclosure relates generally to vending machine transactions. Particular embodiments relate to methods and apparatus to enable and perform payment card transactions at vending machines with mobile devices.

BACKGROUND OF DISCLOSURE

Payment cards such as credit cards and debit cards are very widely used for all forms of financial transaction. The use of payment cards has evolved significantly with technological developments over recent years. Payment cards typically have a magnetic stripe readable by a magnetic stripe reader on a point of sale (POS) terminal to perform a transaction, and now generally also contain an integrated circuit ("chip cards" or "smart cards") communicate with a smart card reader in the POS terminal. Using this approach, a transaction is typically confirmed by a personal identification number (PIN) entered by the card user. Cards of this type typically operate under the EMV standard for interoperation of chip cards and associated apparatus (such as POS terminals and ATMs). ISO/IEC 7816 provides a standard for operation of cards of this type.

Technology has further developed to provide payment cards which operate contactlessly—under EMV, these are covered under the ISO/IEC 14443 standard. Using such cards, the account number can be read automatically from the card by a POS terminal, generally using a short range wireless technology such as Radio Frequency Identification (RFID)—this approach is generally referred to as "contactless" or "proximity" payment. This is typically enabled by embedding of an RFID tag in a card body together with a suitable antenna to allow transmission and receipt of wireless signals—the transmissions may be powered by a radio frequency interrogation signal emitted by a proximity reader in the POS terminal. The present applicants have developed a proprietary system, known as PayPass®, for performing contactless transactions.

A recent development is the use of a computing device such as a mobile telephone as a proxy for a payment card. The present applicants have also developed a mobile payment application, Mobile PayPass™, which can be downloaded to a mobile cellular telephone handset (hereafter "mobile phone") to act as a proxy for a payment card using Near Field Communication (NFC) technology standards, which are built in to the majority of current mobile phones. NFC is a development upon RFID, and NFC-enabled devices are able to operate in the same manner as RFID devices—though an NFC-device is active rather than passive, as it is powered by the mobile phone battery rather than relying on inductive pickup from a reader device. Using Mobile PayPass™, a user can conduct tapping based transactions with a proximity reader, as well as perform account management operations over an appropriate network interface (cellular, local wireless network) in an online banking interface with the user's account provider. A user will now commonly use his or her mobile phone in obtaining banking services, both in mobile payment (such as by use of Mobile PayPass™) and also in locating ATMs and participating merchants (which can be done for MasterCard with MasterCard Nearby™).

A variety of digital payment systems are now available or under development, often involving a combination of a payment application directed to the making of a payment card transaction with a digital wallet to hold personal information. One such system is Apple Pay™, and this and other such systems are showing rapid adoption in the market place.

One area of difficulty for effective application of payment card systems is for vending machines. Vending machine transactions are generally of relatively low value and vending machines while many are connected to a communications infrastructure, many are not. Many vending machines are provided with a payment card interface and typically an associated communications interface to obtain authorisation for a payment card transaction, but this model is unsatisfactory both for vendors (as it drives up the cost of the vending machine) and for users (as the user experience is typically relatively poor).

One way to expand the options for vending machine transactions is to enable transactions using a mobile device. One approach to this is provided by PayRange, who provide a mobile application for a mobile device and a dongle for vending machines allowing short range wireless communication with mobile devices. The mobile application is preloaded with credit, and can then be used in place of cash in a short range wireless transaction with the enabled vending machine.

This approach has the disadvantage of requiring the application to be preloaded with credit, thus committing customer funds to use with vending machines at some point in the future. It would be desirable to enable transactions between mobile devices and vending machines that did not require precommitment of funds in this way, but provided a fully satisfactory user experience, preferably without affecting the cost of ownership and operation of vending machines to the vendor.

SUMMARY OF DISCLOSURE

In a first aspect, the disclosure provides a system to enable a mobile payment device to transact with a vending machine, the system comprising: a vending platform adapted to receive vending machine transaction details, to obtain authorisation of the vending machine transaction from a payment infrastructure, and to provide an authorisation token for the vending machine transaction for the vending machine; a vending machine wireless payment device interface adapted to establish wireless contact with a mobile payment device, to establish vending machine transaction details with the mobile payment device, and to receive the authorisation token and enable vending by the vending machine when the authorisation token has been received; and a mobile payment device adapted to establish wireless contact with the vending machine wireless payment device interface and to establish vending machine transaction details with the vending machine wireless payment device.

Such a system provides effective payment device transactions at a vending machine with sufficient security without significant infrastructural cost. The use model is also straightforward and attractive for the user.

In embodiments, the vending platform is adapted to sign the authorisation token with a vending platform private key, and wherein the vending machine wireless payment device interface is adapted to enable vending by verifying the authorisation token with a vending platform public key.

This approach provides an effective security model. If the vending platform is controlled by or vouched for by the card network provider, this is a party already trusted by those responsible for the different elements of the system.

In embodiments, the vending machine wireless payment device interface is comprised in a vending machine dongle. The vending machine dongle may be connected to a vending machine through a multidrop bus of the vending machine.

In embodiments, vending machine transaction details are sent to the vending platform and the authorisation token is received from the vending platform through the mobile payment device. This approach may be used, for example, when the vending machine itself does not have network capability beyond the short range networking capability used to connect to the mobile payment device.

In embodiments, wireless contact between the mobile payment device and the vending machine wireless payment device interface is conducted by a Bluetooth protocol.

In embodiments, the mobile payment device is a wireless cellular communications device such as a mobile phone, or a tablet equipped to act as a mobile phone.

In embodiments, the mobile payment device comprises a wallet application for interaction with the payment infrastructure and a vending application for interaction with the vending machine wireless payment device interface. The wallet application in certain embodiments supports Digital Secure Remote Payment (DSRP). This provides the benefit of allowing the transaction to be treated as a CP (Customer Present) transaction.

The vending machine transaction details may comprise some or all of the following elements: a vending machine identifier; a mobile payment device identifier; a transaction reference; a timestamp; and a transaction amount. Some or all of the vending machine transaction details may be provided in a hashed value, which may itself then be included in the vending machine transaction details. Where a wallet application is used and it supports DSRP, the wallet application may provide a DSRP token for inclusion in the vending machine transaction details.

In a second aspect, the disclosure provides a vending machine adapted to transact with a mobile payment device, the vending machine comprising a vending machine wireless payment device interface adapted to establish wireless contact with a mobile payment device, to establish vending machine transaction details with the mobile payment device for sending to a vending platform, and to receive an authorisation token; wherein the vending machine is adapted to enable vending when the authorisation token has been received.

In a third aspect, the disclosure provides a vending machine dongle adapted to enable a vending machine to transact with a mobile payment device, the vending machine dongle comprising a vending machine wireless payment device interface adapted to establish wireless contact with a mobile payment device, to establish vending machine transaction details with the mobile payment device for sending to a vending platform, to receive an authorisation token, and to enable vending when the authorisation token has been received.

In a fourth aspect, the disclosure provides a vending platform adapted to enable a mobile payment device to transact with a vending machine, wherein the vending platform is adapted to receive vending machine transaction details, to obtain authorisation of the vending machine transaction from a payment infrastructure, and to provide an authorisation token for the vending machine transaction for the vending machine.

In a fifth aspect, the disclosure provides a mobile payment device adapted to transact with a vending machine, wherein the mobile payment device is adapted to establish wireless contact with the vending machine wireless payment device interface and to establish vending machine transaction details with the vending machine wireless payment device.

In a sixth aspect, the disclosure provides a method of transaction between a mobile payment device and a vending machine, comprising: establishing wireless contact between the mobile payment device and the vending machine; establishing vending machine transaction details between the mobile payment device and the vending machine, and sending the vending machine transaction details to a vending platform associated with a payment infrastructure for authorisation of the vending machine transaction; and receiving an authorisation token for the vending machine transaction, whereby the vending machine enables vending when the authorisation token has been received.

In embodiments, the vending platform signs the authorisation token with a vending platform private key, and the vending machine wireless payment device interface enables vending by verifying the authorisation token with a vending platform public key.

In embodiments, vending machine transaction details may be sent to the vending platform and the authorisation token received from the vending platform through the mobile payment device.

In embodiments, wireless contact between the mobile payment device and the vending machine wireless payment device interface may be conducted by a Bluetooth protocol.

In embodiments, the mobile payment device may comprise a wallet application for interaction with the payment infrastructure and a vending application for interaction with the vending machine wireless payment device interface. The wallet application may support Digital Secure Remote Payment (DSRP).

The vending machine transaction details may comprise some or all of the following elements: a vending machine identifier; a mobile payment device identifier; a transaction reference; a timestamp; and a transaction amount. Some or all of the vending machine transaction details may be provided in a hashed value, wherein the hashed value is also included in the vending machine transaction details. The wallet application may provides a DSRP token for inclusion in the vending machine transaction details.

In a seventh aspect, the disclosure provides a method at a mobile payment device for transacting with a vending machine, the method comprising: establishing wireless contact with the vending machine; establishing vending machine transaction details with the vending machine, and sending the vending machine transaction details to a vending platform associated with a payment infrastructure for authorisation of the vending machine transaction; and receiving an authorisation token for the vending machine transaction for provision to the vending machine for the vending machine to enable vending when the authorisation token has been received.

In an eighth aspect, the disclosure provides a method at a vending machine for transacting with a mobile payment device, the method comprising: establishing wireless contact with the mobile payment device; establishing vending machine transaction details with the mobile payment device, and sending the vending machine transaction details to a vending platform associated with a payment infrastructure for authorisation of the vending machine transaction; and receiving an authorisation token for the vending machine transaction, and enabling vending when the authorisation token has been received.

In a ninth aspect, the disclosure provides a method (and associated system) for conveying vending machine information to a vending machine provider in a mobile transaction between the vending machine and a mobile payment device, the method comprising preparing vending machine status information at the vending machine, providing the vending machine status information for combination with vending machine transaction details, and sending from the mobile payment device the vending machine transaction details to authorise the mobile transaction and the vending machine status information for routing to a vending machine owner or servicer.

This approach is particularly effective when the vending machine itself lacks other than short range network connectivity. It can be used to leverage mobile payment device connectivity to provide telemetry of a vending machine estate.

In a tenth aspect, the disclosure provides a system and method for providing vending offers for use of a vending machine with a mobile payment device, wherein interaction of the vending machine with the mobile payment device is tracked in a user vending machine history, and offers and rewards are provided to the user in accordance with the vending machine history.

Using this approach, offers may be customised to specific users based on their history of interaction with specific vending machines (or in embodiments with vending machines of a specific type).

BRIEF DESCRIPTION OF FIGURES

Embodiments of the disclosure will now be described, by way of example, with reference to the accompanying Figures, of which:

FIGS. 6a, 6b and 6c show three alternative system designs providing different embodiments of the disclosure.

DESCRIPTION OF SPECIFIC EMBODIMENTS

Specific embodiments of the disclosure will be described below with reference to the Figures.

Figure 1:
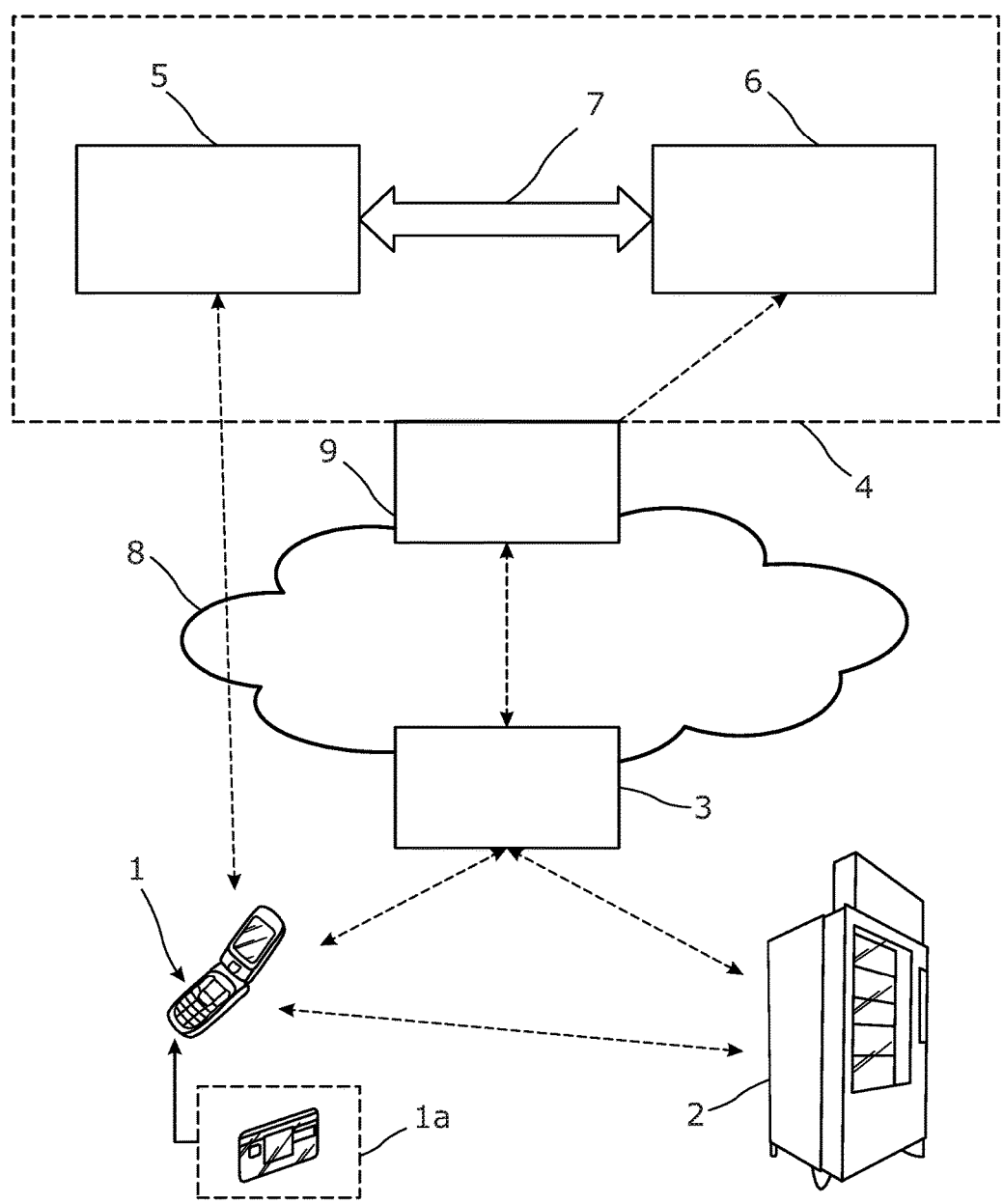
FIG. 1 shows each element of a system adapted for implementing embodiments of the disclosure.

FIG. 1 shows each element of a system adapted for implementing embodiments of the disclosure.

A user (not shown) has a mobile phone 1 (or other mobile computing device) adapted to act as a mobile payment device. These devices typically have processors and memories for storing information including firmware and applications run by the respective processors. A payment device that is not itself a payment card may be used with an appropriate application as a payment card proxy—in this case, a proxy for payment card 1a. The mobile payment device 1 is adapted to communicate with other elements of a payment infrastructure. For short range communication with a terminal such as a point of sale (POS) terminal, this may comprise antennae and associated hardware and software to enable communication by NFC and associated contactless card protocols such as those defined under ISO/IEC 14443, or they may comprise an antenna and associated hardware and software to allow local wireless networking using 802.11 protocols or any combination of the above. The mobile payment device will typically be able to communicate with the public internet through a cellular wireless telecommunications network or by short range networking (such as WiFi).

The other transacting party shown here is a vending machine 2. The vending machine 2 and the mobile payment device 1 communicate by an appropriate short range networking protocol (such as Bluetooth LE, though other protocols such as NFC can also be used). Transaction details are communicated to a payment infrastructure 4 through a vending platform 3. In the arrangement shown, both the mobile payment device 1 and the vending machine 2 can make a direct connection to the vending platform 3, though in some embodiments described below, the vending platform 2 cannot make a direct connection with the vending platform 3 but can communicate only indirectly via mobile payment device 1 during the course of a transaction. Alternatively, if the vending machine 2 has network connectivity in embodiments all communication with the vending platform 3 relating to the transaction may be routed through the vending machine 2.

The vending platform 3 connects to a payment infrastructure 4 through an internet payment gateway 9, either through the public internet 8 or by a dedicated path. While routing to the payment infrastructure over a public or publicly observable infrastructure is shown, encryption is provided as necessary to ensure that transaction and other sensitive details are only communicated securely.

The payment infrastructure may be essentially conventional, linking card issuing banks (shown as issuing bank 5) with transaction acquiring banks (shown as acquiring bank 6) through a payment card network 7. The mobile payment device 1 is also shown as able to communicate with its issuing bank 5 directly (in practice, this may be mediated through the payment card network 7).

Figure 2:
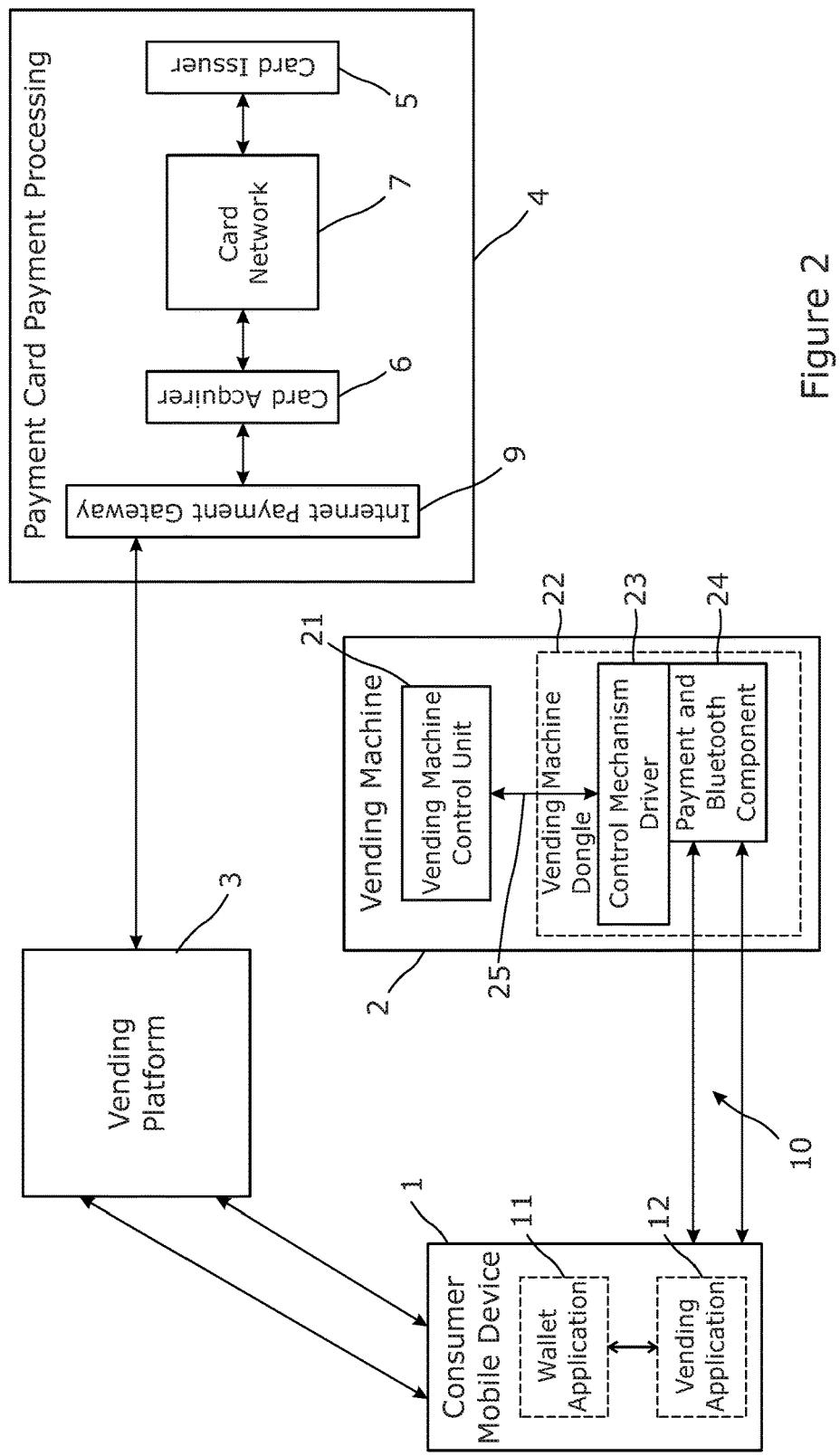
FIG. 2 shows schematically the functional role of each of the main elements of the system of FIG. 1 adapted for carrying out an embodiment of the disclosure.
Figure 3:
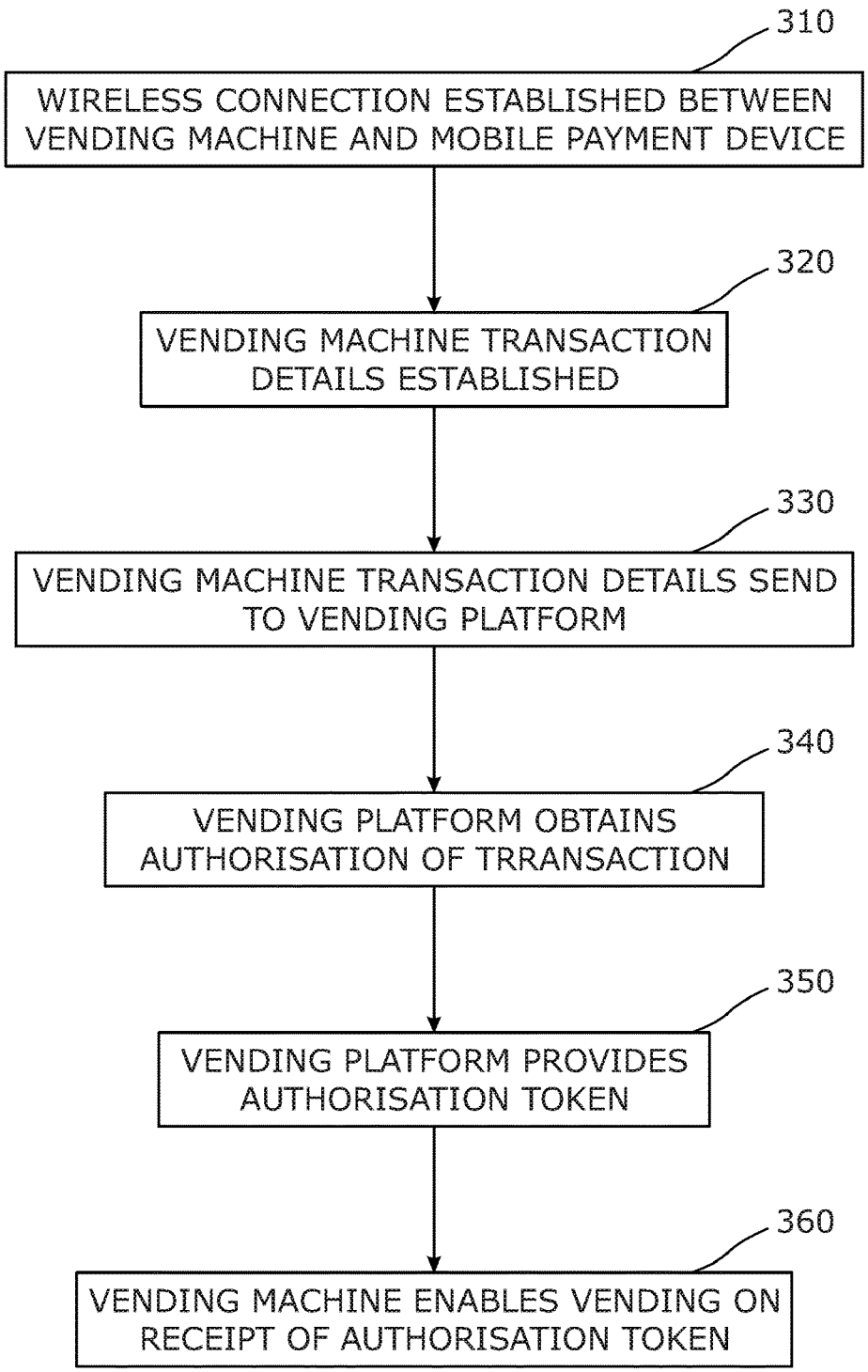
FIG. 3 shows a method of carrying out a vending transaction according to an aspect of the disclosure.

The main elements of the system of FIG. 1 will now be described in more detail with reference to FIG. 2.

Mobile payment device 1—also here termed consumer mobile device, or mobile phone—has the conventional elements of such devices (processor, memory, communications hardware), including the capability for at least one short range networking technology—in the embodiments described below, this will be Bluetooth LE, but other short range networking technologies can easily be used as well or as an alternative. The mobile payment device has two installed applications: a wallet application 11 to act as a payment card proxy and a vending application 12 to perform a vending machine transaction when in communication with the vending machine 2 and (in embodiments) the vending platform 3. The two applications may be integrated together, or may be separate: for example, the vending application 12 may be adapted to interact with an existing wallet application 11 such as Apple Pay. As will be discussed further below, in embodiments the wallet application supports the applicant's Digital Secure Remote Payment (DSRP) protocol.

The vending machine 2 comprises a conventional vending machine control unit 21. This control unit 21 controls vending and other functions of the vending machine, and is connected to the normal vending machine interface and conventional payment systems such as a coin acceptor and even a conventional card acceptor (both not shown). However, the control unit 21 can also accept instructions and communicate through a multidrop bus (MDB) interface—this is a standard component of a conventional vending machine. Connected to the multidrop bus is a vending machine dongle 22. The vending machine dongle 22 is an independent computing device that interacts with the control unit 21 through the multidrop bus 25 and with the mobile payment device 1 through a short range wireless connection 10. The vending machine dongle 22 communicates with the mobile payment device 1 through the short range wireless connection 10 to enable payment for a transaction and to obtain proof that a transaction has been authorised and vending should be enabled. The vending machine dongle also communicates with the control unit 21 to obtain transaction details and to instruct the control unit 21 to enable vending when authorised payment is received.

The vending platform 3 is shown here as communicating with the mobile payment device 1, and not with the vending machine 2—as shown below, in other embodiments there may be a connection between the vending platform 3 and the vending machine 2, but the embodiment shown does not rely on there being any direct connection between the two. There is a direct connection shown between the mobile payment device 1 and the vending platform 3—this may be, for example, by data communication over a cellular wireless telecommunications network. The vending platform 3 is computing apparatus (containing conventional elements such as a processor, memory and networking apparatus), but in embodiments must be secure and adapted for cryptographic operations, in particular of signing data with the private key of a card network or other party trusted by the vending machine owner.

The vending platform 3 communicates with the payment infrastructure 4 in a conventional manner, similar for example to a mobile point of sale terminal, typically over the public internet. The vending platform 3 interacts with the internet payment gateway 9, which then propagates transaction information on to the card issuer 6, card network 7 and card issuer 5 as necessary, and receives the results of a transaction authorisation process and feeds them back to the vending platform 3.

In general terms, a vending machine transaction according to an embodiment of the disclosure may be carried out in the following way. A wireless connection is established 310 between a vending machine 2 and a mobile payment device 1—as discussed below, this may be initiated by either of the parties or may be the result of a discovery process. When a connection is established and the user has indicated that he or she wishes to transact, transaction details are established 320 (this may use the existing user interface of the vending machine 2 or options may be provided through another route, such as a virtual user interface presented to the user by the vending application) between the mobile payment device 1 and the vending machine 2, and these transaction details are then sent 330 (this may be either by the mobile payment device 1 or the vending machine 2 depending on the embodiment) to the vending platform 3. The vending platform then obtains 340 authorisation for the transaction from the payment infrastructure and provides 350 an authorisation token which provides proof to the vending machine 2 that the transaction has been authorised. On receipt 360 of the authorisation token, the vending machine 2 enables vending to take place.

Figure 4A:
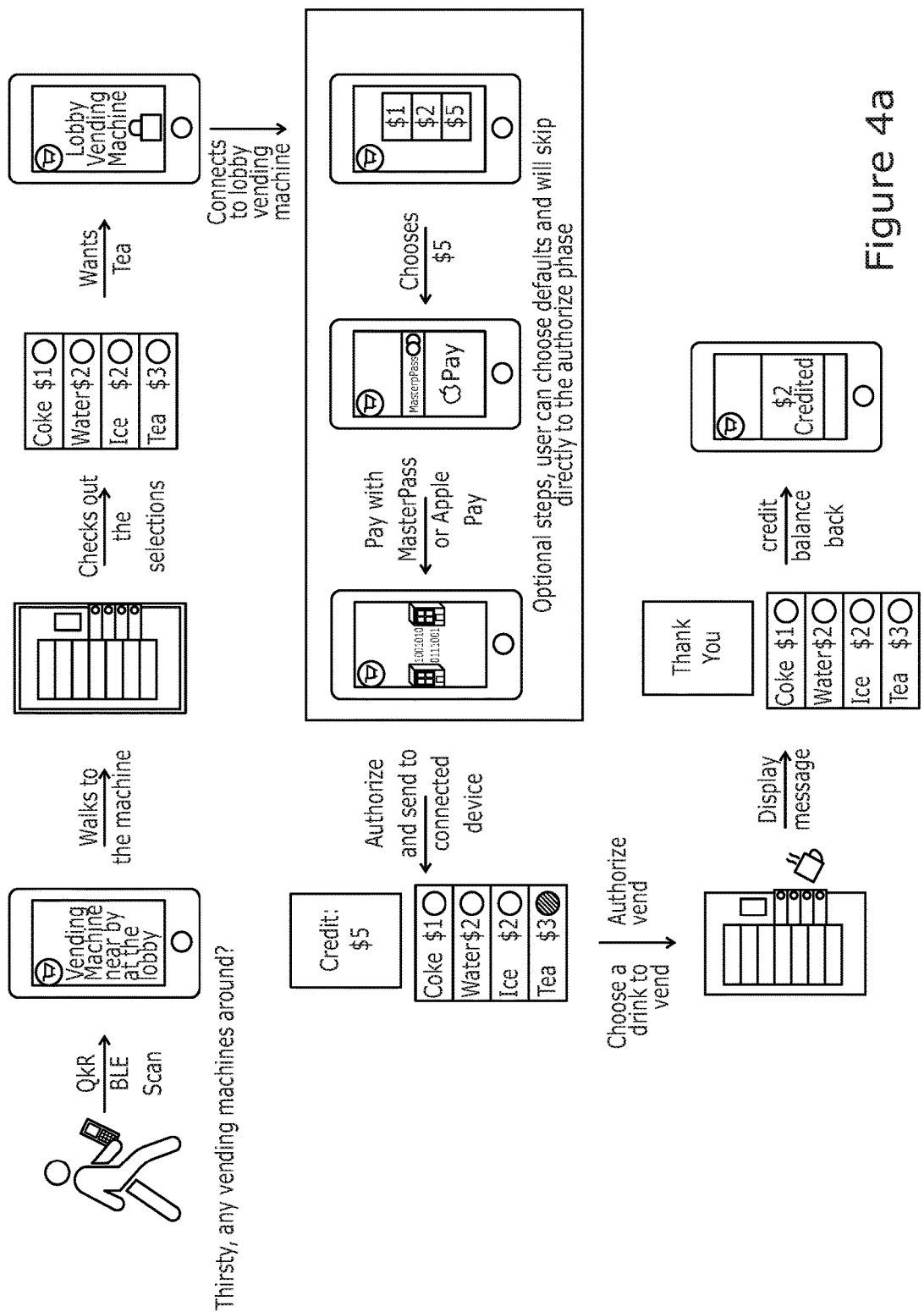
FIGS. 4a and 4b show two alternative scenarios for implementing embodiments of the disclosure.
Figure 4B:
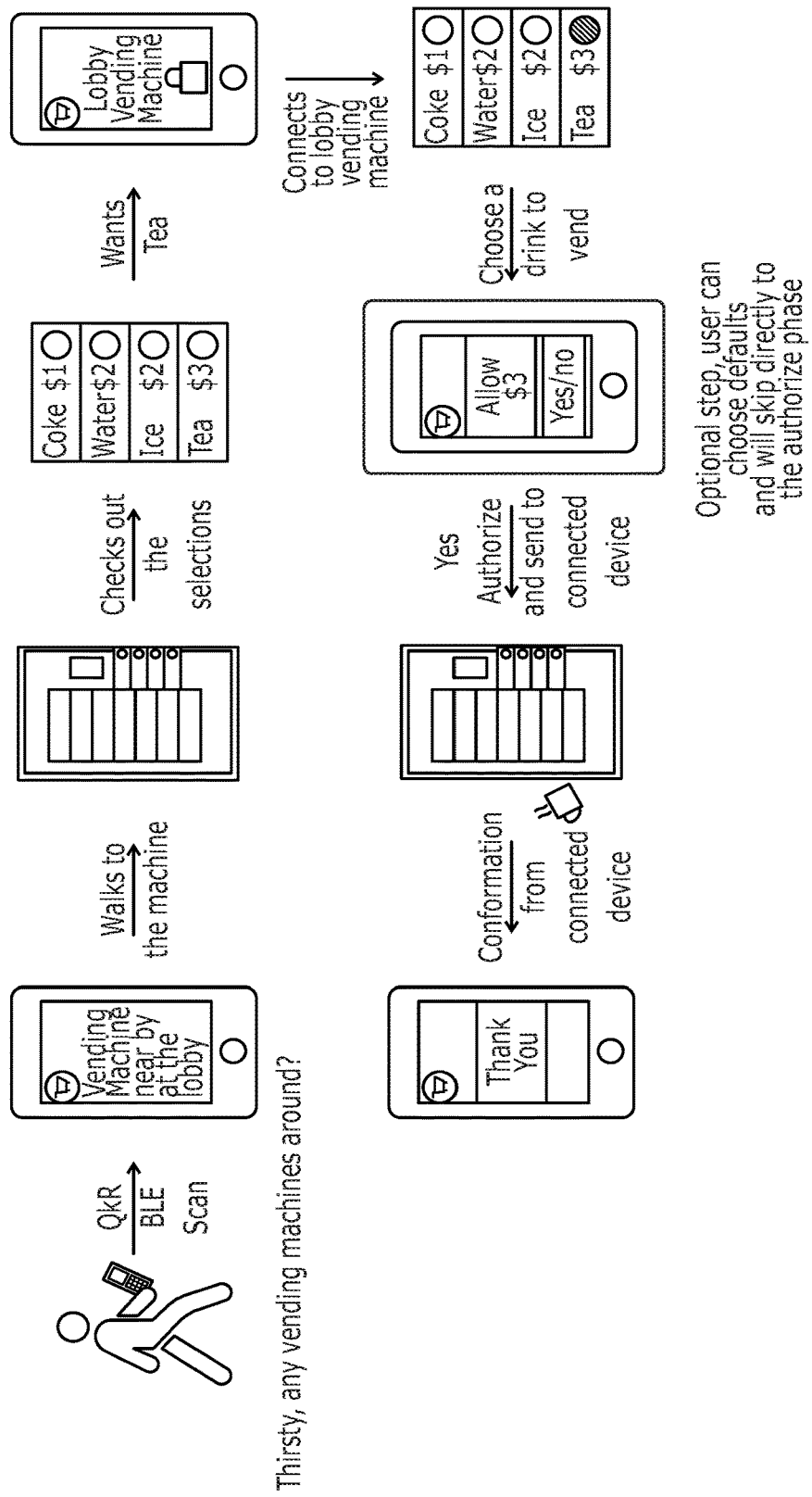

Different models are available within this overall structure, as is shown from FIGS. 4a and 4b. FIG. 4a illustrates a model in which a user approaches a vending machine after a discovery phase, and sets up a transaction to provide a predetermined credit to the vending machine, so final selection can be made after the credit with the vending machine then indicating an actual cost of selections with a resultant refund to the user. FIG. 4b illustrates an alternative approach in which selection is made before payment, so that exact payment can be made to the vending machine with no need for a refund model. An embodiment of this type will be further discussed below.

The steps of a particular embodiment will now be described in greater detail with reference to FIG. 5. In this embodiment, selection is made before payment, and the vending machine 2 communicates through vending machine dongle 22 (described below as the vending component) with the mobile payment device 1 and not directly with the vending platform 3. The mobile payment device 1 is shown in three aspects: the vending application 12, the wallet application 11, and the user interface (represented simply by a user).

Initially, there is a discovery phase 51. This can be driven in a number of ways—for example, the vending application 12 may be associated with a searchable mapping application providing vending machine locations, and the user may select a specific vending machine using this mapping location. Alternatively, the user may simply walk close enough to the machine for its proximity to be communicated to the user. In any event, the user walks 511 within proximity of the vending machine. The vending component emits 512 a Bluetooth LE signal at a fixed interval. The vending application triggers a local push notification 513 when in proximity of the Bluetooth LE signal. As noted before, any appropriate short range networking solution may be employed here instead of (or as well as) Bluetooth LE—it is particularly appropriate to use a choice with a substantial installed base in mobile devices (making NFC another suitable option).

After the discovery phase 51, there follows a connection phase 52. The user can interact with the notification to connect to the vending component or select the vending component directly from the vending application. The vending application connects 521 to the vending component over Bluetooth. Once the connection is established the vending application sends 522 the device identifier to the vending component. The vending component thus has the device identifier available for compilation of transaction details.

In this arrangement, the next phase is the selection phase 53. The user makes their selection 531 on the vending component through the standard vending component keyboard or interface. While the simplest approach is just to use the standard interface of the vending machine, it is also possible in embodiments to provide a virtual vending machine interface at the mobile payment device—this would require an additional step of the vending component providing at least a menu of options (and possibly a defined presentation arrangement) to the mobile payment device, or such an interface being preloaded into the vending application. The vending component creates an in-memory reference for the transaction and returns 532 the following data to the vending application.

Vending Component Identifier
Transaction Reference
Timestamp
Total Amount
Hashed Value The vending component creates a hash of the following data (machineId/transactionRef/timestamp/amount/deviceId) using a SHA-256 algorithm—alternative choices could of course be made. The hash can be expressed as follows:

Hash=SHA-256(machineId/transactionRef/timestamp/amount/deviceId)

The vending application displays 534 the total amount to the user.

In this arrangement the selection phase 53 is followed by the payment phase 54.

The user selects 541 "pay" on the vending application. The vending application then opens the wallet application 542. The user confirms payment on the wallet application 543.

In this embodiment, the wallet application is adapted to make payment through the applicant's Digital Secure Remote Payment (DSRP) protocol, discussed at http://www.mastercard.us/merchants/digital_secure_remote_payment.html—Apple Pay is an example of a wallet application adapted to use DSRP. While not essential, this provides an additional level of confidence to the parties and allows the transaction to be treated as a CP (Customer Present) transaction rather than a CNP (Customer Not Present) transaction. The wallet application generates 544 the DSRP token required to make a DSRP payment. The wallet application returns 545 the DSRP token to the vending application. The vending application then sends 546 the required payment data (the vending machine transaction details) to the vending platform. This payment data includes:

Vending Component Identifier
Transaction Reference
Timestamp
Total Amount
Device Id
Hashed Value
DSRP token The vending platform validates 547 the hash by comparing the result of SHA-256 (machineId/transactionRef/timestamp/amount/deviceId) with the supplied hash. After validation, the vending platform processes 548 the payment through the payment gateway using the DSRP token. On successful completion of this processing, the vending platform generates 551 a confirmation token (authorisation token). To do this, the vending platform uses its private key to perform a SHA256withRSA signature on the hashed value. As the vending platform is using a private key (this may for example be the private key, or one of the private keys, of the card network provider—the card network provider is in a suitable position to be trusted by all parties involved, so this is appropriate), the vending platform should be protected from subversion and preferably in a secure location. The vending platform returns 552 the confirmation token to the vending application. The vending application then sends 553 the confirmation token to the vending component. The vending component verifies 554 the confirmation token signature using the vending platform's public key and the SHA256withRSA algorithm. The vending component deletes 555 the in-memory reference for this transaction. The vending machine then dispenses 556 the item to the user.

The process described above with reference to FIG. 5 may be varied in a number of ways to produce different implementations. The networking capabilities of the vending machine 2 will affect the options available. In the FIG. 5 arrangement, communication of the transaction to the vending platform is carried out through the mobile payment device. Three different approaches are shown in FIGS. 6a, 6b and 6c.

Figure 6A:
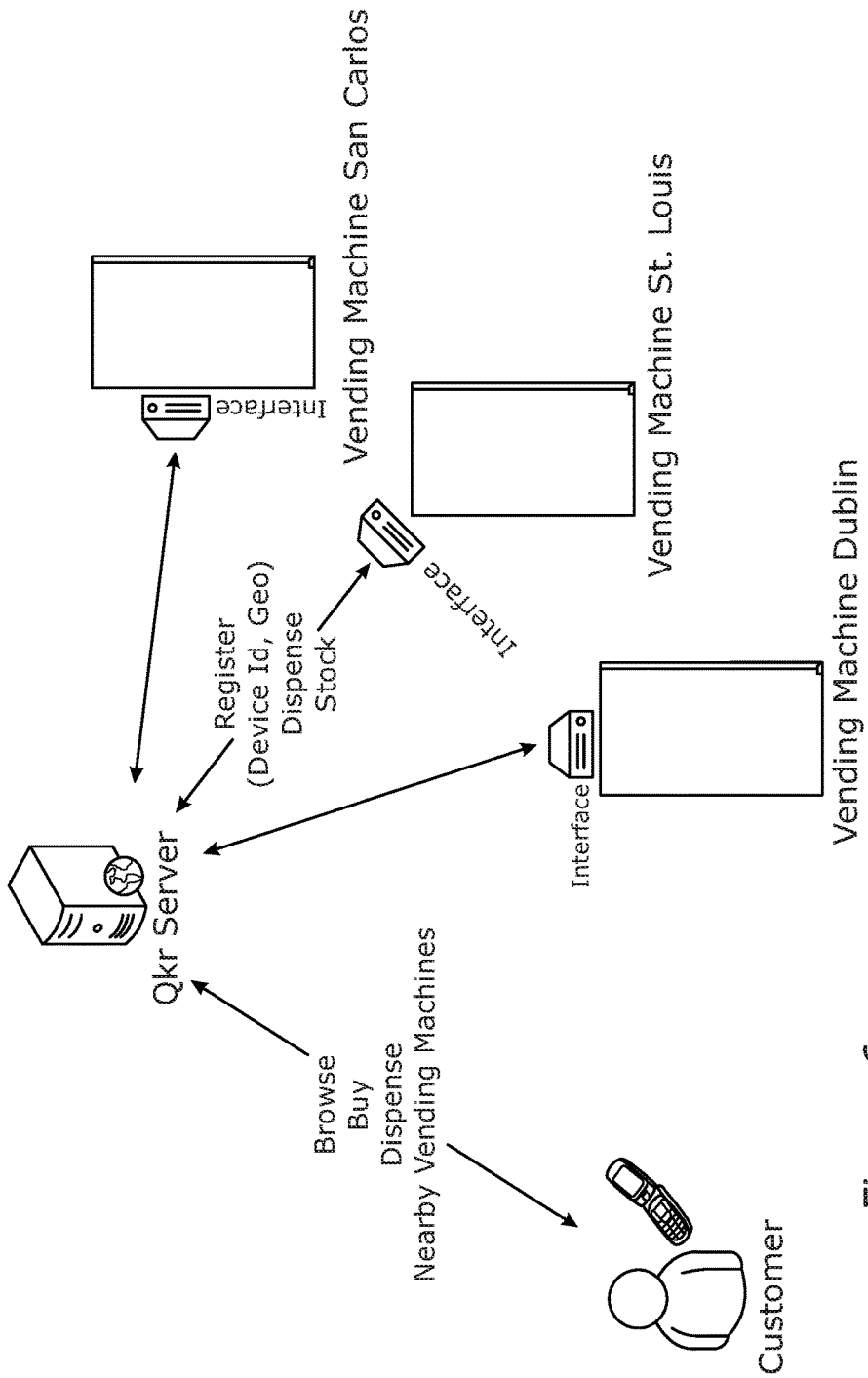

In the approach shown in FIG. 6a, the vending platform interacts with all vending machines and also with the user (customer). This approach is suitable for providing high levels of service with additional features such as inventory management (though there are alternative approaches for this, as discussed below), but requires a high degree of integration between the vending platform and the vendors or vending machine providers.

In the approach shown in FIG. 6b, the vending machines interact with the vending platform, but the user does not. Again, this approach provides high service levels and relatively high security but requires tight integration of the vending platform with vendors or vending machine providers.

The approach shown in FIG. 6c is broadly similar to that shown in FIG. 6b, but more limited in that funds are provided in advance to the mobile payment device, limiting the requirements for authorisation.

Figure 7:
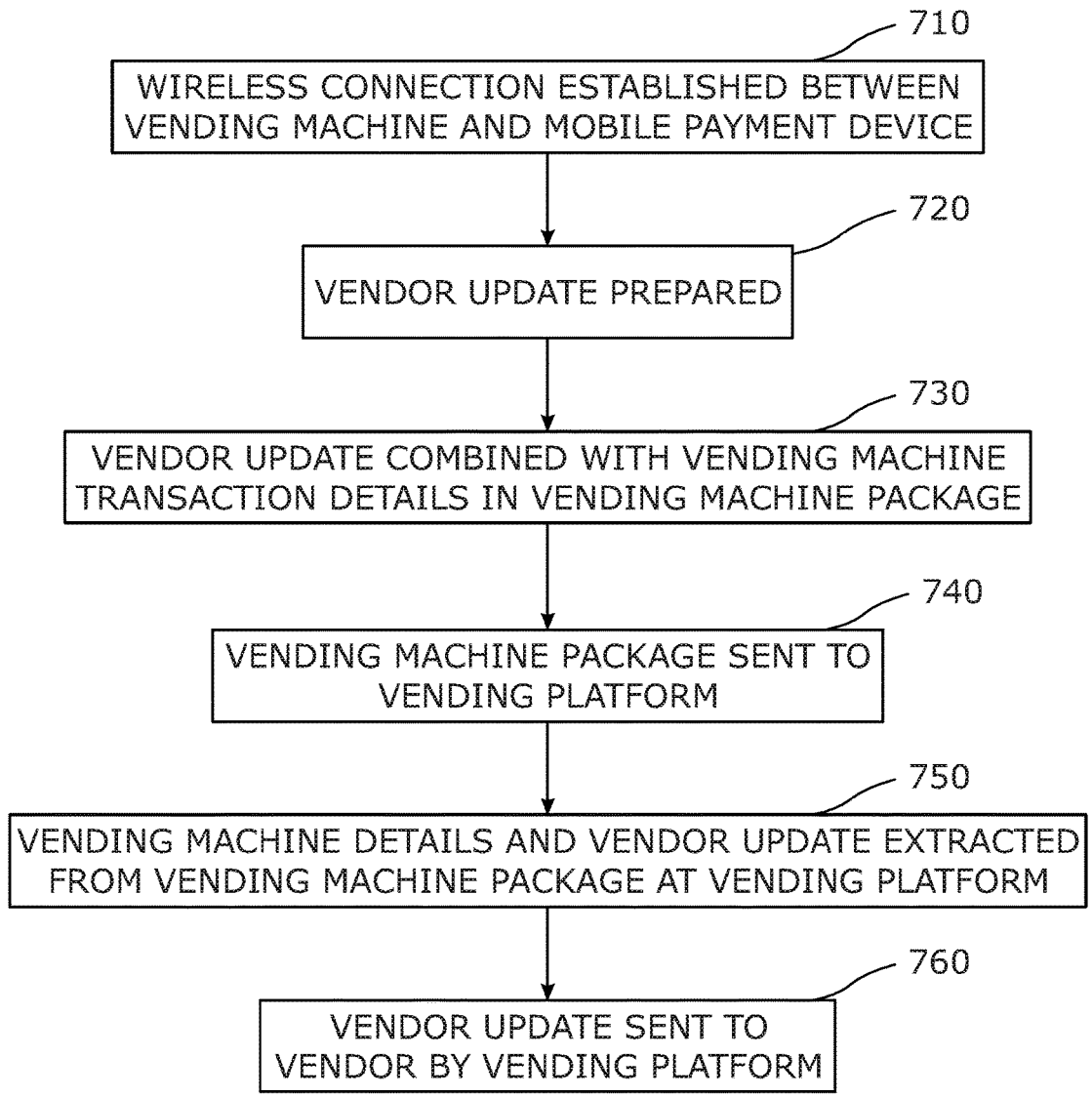
FIG. 7 illustrates how embodiments of the disclosure can be used to provide telemetry for vending machines to vending machine providers.

In embodiments where the vending machine 2 lacks a network connection to the outside world, the mobile payment device 1 can be used to provide telemetry of the vending machine. Information such as stock level, cash level and the need for maintenance can be provided together as a vendor update. FIG. 7 shows how this vendor update can be provided to vendors using the infrastructure shown in FIGS. 1 and 2.

Figure 5:
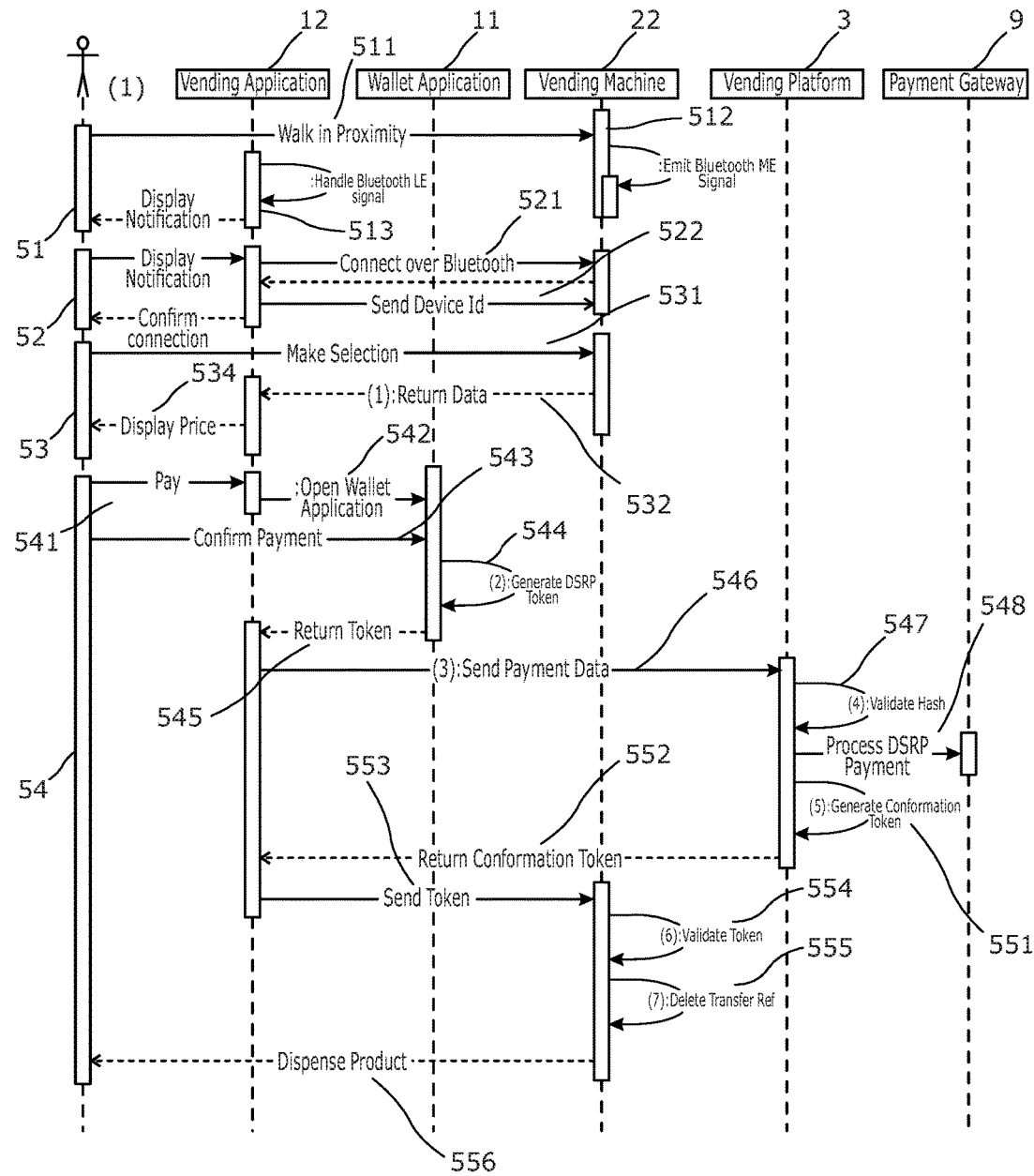
FIG. 5 shows in detail the steps in one specific embodiment of the disclosure implementing the scenario of FIG. 4b.

As can be noted, certain steps in the process shown in FIG. 7 are equivalent to or associated with steps in the process shown in FIG. 5. The first step is the same—a wireless connection is established 710 between the vending machine 2 and the mobile payment device 1. The vendor update is then prepared 720, or a prepared vendor update is made ready to be sent out. When transaction details are ready to be sent to the vendor platform, the vending machine provides the payment device with the vendor update to combine 730 with the transaction details, the combined vending machine package then being sent 740 to the vendor platform. The vendor platform extracts 750 the vending machine transaction details and the vendor update from the combined vending machine package. While the vending machine transaction details are checked and sent to the payment infrastructure, the vendor platform establishes a vendor identity associated with the vending machine identifier and the vendor update is sent 760 to the vendor.

The ability to locate specific payment devices at specific vending machines allows for new commerce models, such as customer loyalty based on specific vending machines—for example, transactions by a particular mobile payment device could be tracked to allow a reward for each tenth transaction, or offers may be provided to users for a particular machine in a particular time period. Data privacy requirements must of course be met, so such approaches should generally avoid the use of any personal data unless the owner of the data gives permission and then only for the purposes permitted.

As the person skilled in the art will appreciate, modifications and variations to the above embodiments may be provided, and further embodiments may be developed, without departing from the spirit and scope of the disclosure. Reference to standards and proprietary technologies are provided for the purpose of describing effective implementations, and do not limit the scope of the disclosure.

What is claimed is:

1. A system that enables a mobile payment device to transact with a vending machine, the system comprising:
    a vending machine wireless payment device interface;
    a mobile payment device configured to (i) establish wireless contact with the vending machine wireless payment device interface, and (ii) upon initiation of a transaction with the vending machine, generate a payment token; and
    a vending platform configured to
        receive vending machine transaction details from one of the vending machine and the mobile payment device, said vending machine transaction details (i) being established between the vending machine wireless payment device interface and the mobile payment device, and (ii) including at least the payment token generated by the mobile payment device,
        communicate with a payment infrastructure and obtain authorisation of the vending machine transaction from the payment infrastructure, and
        generate an authorisation token for the vending machine transaction for the vending machine,
        sign the authorisation token with a vending platform private key, and
    wherein the vending machine wireless payment device interface is configured to receive the authorisation token from the vending platform and, in response to receiving the authorisation token, enable vending by the vending machine, by verifying the authorisation token with a vending platform key.

2. The system as claimed in claim 1, wherein the vending machine wireless payment device interface is comprised in a vending machine dongle.

3. The system as claimed in claim 2, wherein the vending machine dongle is connected to a vending machine through a multidrop bus of the vending machine.

4. The system as claimed in claim 1, wherein vending machine transaction details are sent to the vending platform and the authorisation token is received from the vending platform through the mobile payment device.

5. The system as claimed in claim 1, wherein wireless contact between the mobile payment device and the vending machine wireless payment device interface is conducted by a Bluetooth protocol.

6. The system as claimed in claim 1, wherein the mobile payment device comprises a wallet application for interaction with the payment infrastructure and a vending application for interaction with the vending machine wireless payment device interface.

7. The system as claimed in claim 1, wherein the vending machine transaction details comprise at least some of the following elements: a vending machine identifier; a mobile payment device identifier; a transaction reference; a timestamp; and a transaction amount, and wherein at least some of the vending machine transaction details are provided in a hashed value, wherein the hashed value is also included in the vending machine transaction details.

8. The system as claimed in claim 7, wherein the mobile payment device comprises a wallet application for interaction with the payment infrastructure and a vending application for interaction with the vending machine wireless payment device interface, and wherein the wallet application supports Digital Secure Remote Payment (DSRP) and wherein the wallet application provides a DSRP token for inclusion in the vending machine transaction details.

9. A method at a mobile payment device for transacting with a vending machine, the method comprising:
    establishing, by the mobile payment device, wireless contact with the vending machine;
    initiating, by the mobile payment device, a transaction with the vending machine;
    upon initiating said transaction, generating, by the mobile payment device, a payment token;
    establishing, by the mobile payment device, vending machine transaction details with the vending machine, wherein said vending machine transaction details includes at least the payment token generated by the mobile payment device; and
    sending, by the mobile payment device, the vending machine transaction details to a vending platform associated with a payment infrastructure for authorisation of the vending machine transaction,
        wherein the vending platform generates an authorisation token for the vending machine transaction for the vending machine, signs the authorisation token with a vending platform private key, and sends the authorisation token to the vending machine, and
        wherein a vending machine wireless payment device, of the vending machine, in response to receiving the authorisation token, enables vending, by the vending machine, by verifying the authorisation token.

10. The method as claimed in claim 9, wherein wireless contact between the mobile payment device and the vending machine wireless payment device interface is conducted by a Bluetooth protocol.

11. The method as claimed in claim 9, wherein the mobile payment device comprises a wallet application interacting with the payment infrastructure and a vending application interacting with the vending machine wireless payment device interface.

12. The method as claimed in claim 11, wherein the wallet application supports Digital Secure Remote Payment (DSRP).

13. The method as claimed in claim 9, wherein some or all of the vending machine transaction details are provided in a hashed value, wherein the hashed value is also included in the vending machine transaction details.

14. The method as claimed in claim 13, wherein the mobile payment device comprises a wallet application which supports Digital Secure Remote Payment (DSRP) interacting with the payment infrastructure and a vending application interacting with the vending machine wireless payment device interface, and wherein the wallet application provides a DSRP token for inclusion in the vending machine transaction details.

15. A method at a vending machine for transacting with a mobile payment device, the method comprising:
    establishing wireless contact with the mobile payment device;
    establishing, by the vending machine, vending machine transaction details with the mobile payment device, wherein the vending machine transaction details include a payment token generated by the mobile payment device;
    sending, by the vending machine, the vending machine transaction details to a vending platform associated with a payment infrastructure for authorisation of the vending machine transaction, wherein the vending platform generates an authorisation token for the vending machine transaction, signs the authorisation token with a vending platform private key, and sends the authorisation token to the vending machine;

receiving, by the vending machine, the authorisation token for the vending machine transaction, and verifying, by a vending machine wireless payment device interface, of the vending machine, the authorisation token with a vending platform public key, and in response to said verification, enabling, by the vending machine, vending.

16. The method as claimed in claim 15, wherein wireless contact between the mobile payment device and the vending machine wireless payment device interface is conducted by a Bluetooth protocol.

17. The method as claimed in claim 15, wherein the vending machine transaction details include at least one of the following elements: a vending machine identifier; a mobile payment device identifier; a transaction reference; a timestamp; and a transaction amount.

18. The method as claimed in claim 15, wherein some or all of the vending machine transaction details are provided in a hashed value, wherein the hashed value is also included in the vending machine transaction details.

* * * * *